(12) United States Patent
Camus

(10) Patent No.: US 8,494,251 B2
(45) Date of Patent: Jul. 23, 2013

(54) SYSTEM AND METHOD FOR MEASURING IMAGE QUALITY

(75) Inventor: Theodore Armand Camus, Marlton, NJ (US)

(73) Assignee: SRI International, Menlo Park, CA (US)

(*) Notice: Subject to any disclaimer, the term of this patent is extended or adjusted under 35 U.S.C. 154(b) by 1136 days.

(21) Appl. No.: 12/352,192

(22) Filed: Jan. 12, 2009

(65) Prior Publication Data

US 2009/0180682 A1 Jul. 16, 2009

Related U.S. Application Data

(60) Provisional application No. 61/020,554, filed on Jan. 11, 2008.

(51) Int. Cl.
*G06K 9/00* (2006.01)
(52) U.S. Cl.
USPC .......................................................... 382/154

(58) Field of Classification Search
USPC ................... 382/154; 345/419; 348/140, 699, 348/E7.085; 712/11, 34, 35
See application file for complete search history.

(56) References Cited

U.S. PATENT DOCUMENTS

| | | | | |
|---|---|---|---|---|
| 5,867,591 A * | 2/1999 | Onda | ............................. | 382/154 |
| 5,867,592 A * | 2/1999 | Sasada et al. | ................. | 382/154 |
| 6,754,367 B1 * | 6/2004 | Ito et al. | ........................ | 382/103 |
| 7,194,126 B2 * | 3/2007 | Konolige | ....................... | 382/154 |
| 2004/0258279 A1 * | 12/2004 | Hirvonen et al. | ............ | 382/104 |
| 2006/0140446 A1 * | 6/2006 | Luo et al. | ....................... | 382/104 |
| 2007/0031037 A1 * | 2/2007 | Blake et al. | .................... | 382/173 |
| 2007/0263897 A1 * | 11/2007 | Ong et al. | ...................... | 382/100 |
| 2009/0129667 A1 * | 5/2009 | Ho et al. | ........................ | 382/154 |

* cited by examiner

*Primary Examiner* — Amara Abdi
(74) *Attorney, Agent, or Firm* — Moser Taboada

(57) ABSTRACT

The present invention provides an improved system and method for measuring quality of both single and stereo video images. The embodiments of the present invention include frequency content measure for a single image or region-of-interest thereof and disparity measure for stereo images or region-of-interest thereof.

20 Claims, 5 Drawing Sheets

Frame 1:

Image Quality = 92,100,100

Disp2 Quality = 77,88,86

Frame 2:

Image Quality = 75,99,98

Disp2 Quality = 48,84,84

Frame 1:

Image Quality = 95,99,95

Disp2 Quality = 87,89,92

Frame 2:

Image Quality = 59,76,76

Disp2 Quality = 54,60,57

Image Quality = 98,97,95

Disp2 Quality = 62,70,61

Image Quality = 53,50,92

Disp2 Quality = 76,35,86

SYSTEM AND METHOD FOR MEASURING IMAGE QUALITY

CROSS-REFERENCE TO RELATED APPLICATIONS

This application claims the benefit of U.S. Provisional Patent Application No. 61/020,554 filed Jan. 11, 2008, the entire disclosure of which is incorporated herein by reference.

GOVERNMENT RIGHTS IN THIS INVENTION

This invention was made with U.S. government support under contract number 70NANB4H3044. The U.S. government has certain rights in this invention.

FIELD OF THE INVENTION

The invention relates generally to video image quality measures. More specifically, the invention relates to an improved system and method for measuring stereo and single image quality.

BACKGROUND OF THE INVENTION

Over the past, several measures have been taken to detect impairments of one or more stereo cameras of a stereo vision system. The forms of impairments can include camera obstruction of a partial or complete field of view blockage either by solid objects such as leaves on a windshield, environmental factors such as precipitation (water, snow or fog) or low-light conditions, problems with the optical system itself such as poor camera focus, poor camera calibration, poor stereo camera relative alignment or other unanticipated problems with the video. Additionally, low target contrast or texture (while not a camera impairment per se) can also cause poor system measurements when viewing the video images. For example one of these impairments could cause a critical error in stereo measurements by altering the relative orientation of the left and right camera, without benefit of a compensatory recalibration, which in turn would cause incorrect resulting depth computations, etc.

Collision detection systems are known in the art to compute stereo images to detect potential threats in order to avoid collision or to mitigate its damage. The impairments could easily cause the collision algorithms to misidentify these incorrect measurements as potential collision threats, thus creating a false alarm, the effects of which could be drastic. Thus the presence of such impairments, once identified, should cause the system to temporarily disable itself for the duration of the impairment, sometimes called a "failsafe" condition. This would be applicable also in less severe applications, which provide for much wider range of safety and convenience functions, for example, adaptive cruise control.

Stereo depth estimate accuracy can be computed precisely for a given stereo algorithm on a stereo image data with known position and/or ground-truth information. However, this ground-truth information may be unavailable or difficult to collect for real-world scenes, even in controlled settings, and are certainly not available in the uncontrolled settings of a deployed stereo or monocular imaging system. Moreover, such characterizations only measure the accuracy of a stereo algorithm under ideal conditions, and ignore the effects of the kinds of unanticipated impairments noted above. That is, a characterization of a stereo algorithm's accuracy under ideal conditions does not predict and is not able to measure its robustness to various impairments found in uncontrolled real-world conditions.

Some algorithms may attempt to characterize specific impairments such as rain or fog in an operating imaging system using specific characteristics of the impairment itself (such as expected particle size and density), but may not generalize to other impairments such as hail, sleet or a sandstorm and therefore would not be able to reliably invoke a needed failsafe condition. Thus the deployment of practical imaging systems, particularly stereo imaging systems, has a need for a general means to measure both monocular and stereo image quality.

SUMMARY OF THE INVENTION

The present invention provides a method for measuring image quality comprising receiving at least one input image in a region of interest and using an average adjacent pixel difference module for computing an adjacent pixel difference for each valid pixel in the region of interest, summing the at least some of the adjacent pixels' absolute differences and computing the average adjacent pixel difference within the region of interest.

In one embodiment of the present invention, the at least one input image is an original image received from an image sensor and every region in the pixel of interest is considered valid.

In another embodiment of the present invention, the at least one input image is a binarized disparity image formed from a stereo disparity image. The stereo disparity image is computed from a stereo algorithm which explicitly labels each output pixel in the region as valid or invalid.

DETAILED DESCRIPTION OF THE INVENTION

Figure 1:
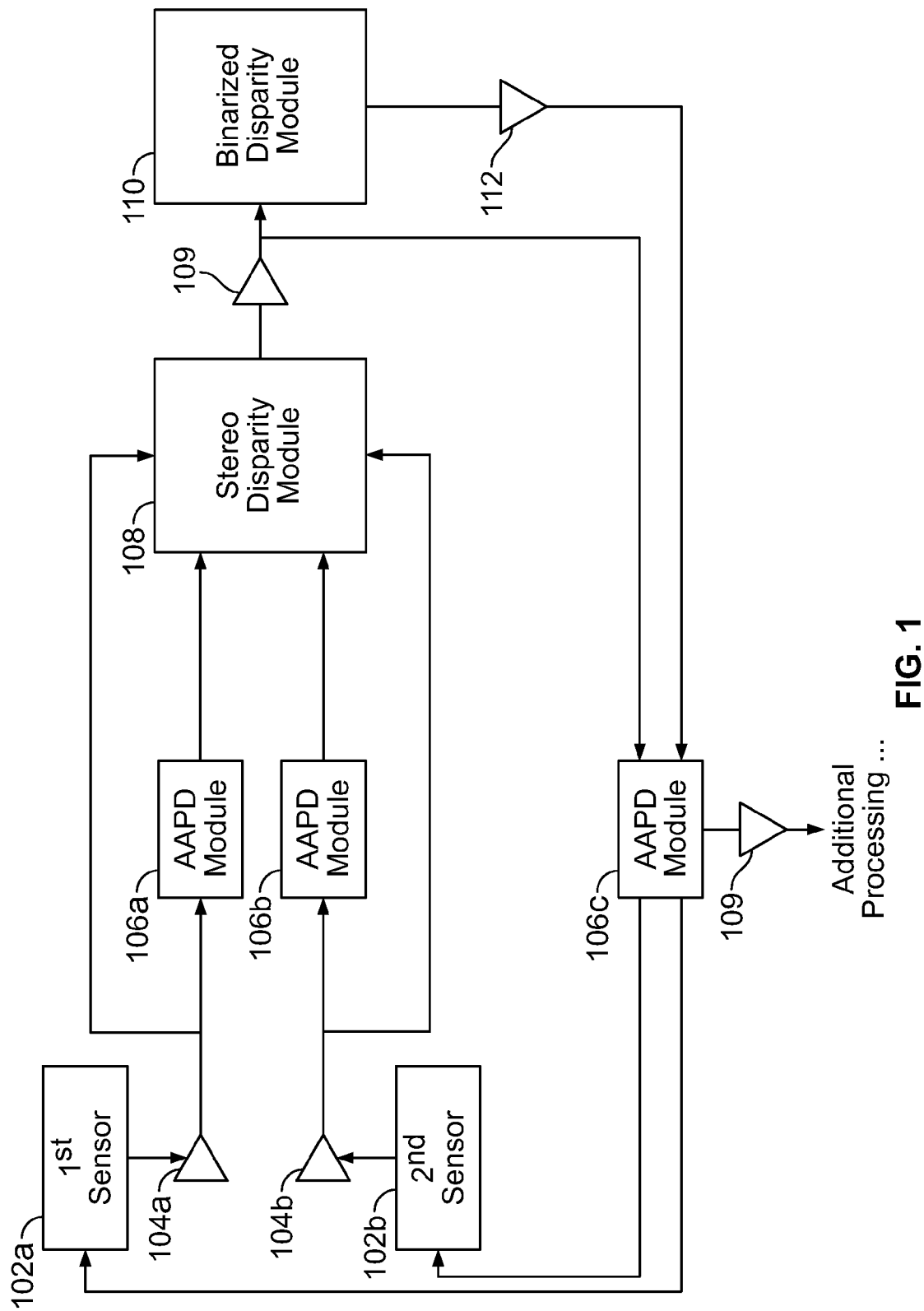
FIG. 1 illustrates a block system diagram for measuring image quality in accordance with an embodiment of the present invention.

The present invention describes various embodiments of image quality measures. Two such measures include frequency Content measure for monocular image quality and disparity measure for stereo image quality. FIG. 1 illustrates a block diagram of a system 100 for measuring image quality according to the two embodiments of the present invention. The system 100 includes a first image sensor 102a, preferably a left camera and a second image sensor 102b, preferably a right camera, for capturing images in a region of interest (ROI). A first image 104a, (preferably a left image) and a second image 104b (preferably a right image) are captured from the first and second cameras 102a and 102b respectively. Note that even though a camera device is chosen as an example for the image sensor, it is known to one skilled in the art, that any device that any device that functions as an image sensor may be used. Alternatively, the images captured from the sensor may be downloaded and stored in any computer data storage device prior to being processed. Such storage devices may include a disk, a memory card, a database in a computer, etc.

The images 104a and 104b are individually processed by an average adjacent pixel difference (AAPD) modules 106a and 106b respectively to provide the frequency content measure of the images as will be described in greater detail below. Based on the frequency content measure, each of the left 104a and the right images 104b from each of the cameras 102a and 102b are then processed jointly by a stereo disparity module 108 to produce a stereo disparity image as will be described in greater detail below. Alternatively, as illustrated in FIG. 1, each of the left and the right images 104a and 104b from both the left and the right cameras 102a and 102b respectively are directly processed by the stereo disparity module 108 to provide the stereo disparity image 109 without measuring the frequency content of the images.

The stereo disparity image 109 is then converted into a binarized stereo disparity image 112 using a binarized disparity module 110. The binarized stereo disparity image 112 is further processed by an AAPD module 106c to compute the disparity measure of the disparity image. Based on this disparity measure, the disparity image can either be forwarded for additional processing or ignored. If the disparity values are good, i.e. fall within a specific threshold, then the disparity image 109 is further processed for various purposes such as object detection, collision detection etc. However, if the disparity values are poor, i.e. fall outside the threshold value, then the disparity image 109 is ignored and a new left and right images are obtained from each of the cameras 102a and 102b to repeat the process as will be described in greater detail below.

Figure 2:
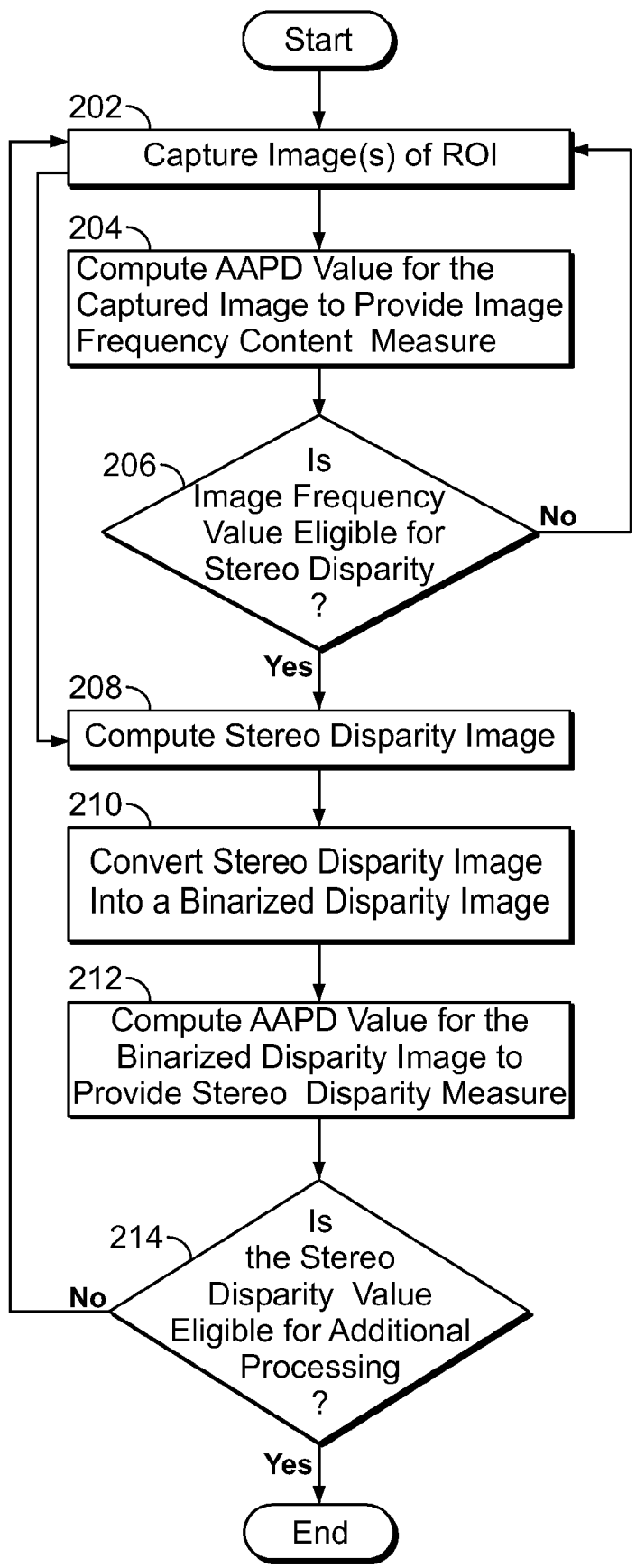
FIG. 2 illustrates a flow diagram for measuring image quality in accordance with an embodiment of the present invention.

Referring to FIG. 2, there is shown a flow diagram of a method for measuring image quality according to the embodiments of the present invention. Initially, in step 202, an image in a region of interest (ROI) is captured from at least one of cameras 102a or 102b. In one embodiment of the present invention, the image quality measure used for monocular image is frequency content measure. This measure includes computing an average adjacent pixel difference (AAPD) in step 204 for one of the captured images 104a and 104b using either the AAPD Module 106a or AAPD module 106b. The AAPD value for a given pixel in the image is the sum of the absolute differences between its value and the value of its adjacent vertical and horizontal neighbors in the image. This prevents the difference values from being counted twice, and suffices to Count only one of each of the vertical and horizontal neighbors. Then, the differences measured are summed up over the entire image and further divided by a total number of valid pixels to measure the frequency content in that image. In computing the AAPD value of this monocular image, every pixel in the image is considered a valid pixel. So, high frequency content results from an image with a lot of fine detail, sharp edges and the difference between the pixel and its adjacent neighbors will be relatively high, yielding a high AAPD value. On the other hand, if there is any type of impairment in which the image has a blur, poor focus, low local contrast, reduced texture etc., the frequency content will be lower yielding a low AAPD value.

Figure 3:
FIG. 3 illustrates two successive pairs of stereo image frames along with their corresponding quality measures in accordance with an embodiment of the present invention.
Figure 3:
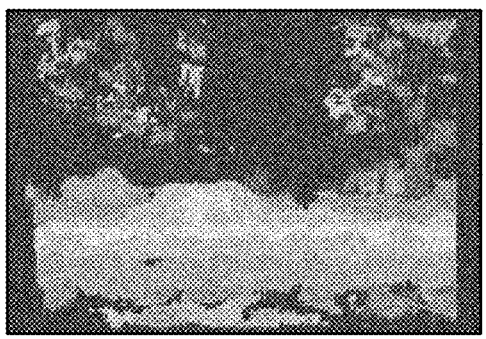
Figure 3:
Figure 3:
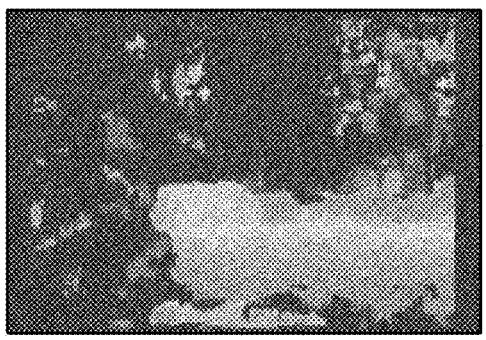

For example, FIG. 3 illustrates two successive pairs of stereo image frames along with their corresponding quality measures according to an embodiment of the present invention. In the examples shown in FIG. 3, the image frames are taken both from the left camera and the right camera, however, the image quality frequency content measure displayed for each frame from only from the right camera. In order to provide a more precise frequency content measure, this frame is preferably divided into thirds, a left third, a center third and a right third. Note that the division of the field-of-view is arbitrary, but dividing it into thirds is suitable for much on-road applications. So, the image frequency content is measured for the left side, the center and the right side of the image frames from the right camera. Image quality values 92, 100, 100 shown in frame 1 are the image score values of the frequency content converted in percentages for the left third, center third and the right third of the right camera image. In the sequence of image frames shown in FIG. 3, the right camera image is blocked from the left side and the percentage image score value of the frequency content left third of the image lowers while the central third and the right third maintain their high spatial frequency content, i.e. good image quality score. So, for example, the image frequency content values in image frame 2 as values 75, 99 and 98 of FIG. 3 illustrate the image deterioration on the left side of the camera.

The frequency content measure for the AAPD measure described above applies to images obtained from a single or a monocular camera, although, the monocular measure can be computed and compared with images from two or more cameras. The frequency content measure would be quite similar for two or more cameras looking at the same scene or view unless there is an obstruction in one or more cameras as discussed above, which would increase the difference in the frequency content of the two images. If this difference were measured to be high, an obstruction or impairment of one of the cameras can be hypothesized.

In another embodiment of the present invention, the image quality measure for binocular images is stereo disparity quality measure. The stereo disparity quality measure includes producing a disparity image. A stereo disparity image is an image computed from images captured from at least two or more stereo cameras which together produce a single disparity image at a given resolution. Thus, unlike the frequency content measure, the stereo disparity quality measure is inherently applicable to at least two camera images, most commonly the left and the right camera images of a stereo image pair. Returning back to the flow chart in FIG. 2, the steps 202 and 204 are repeated at least for the second camera out of the two cameras 102a or 102b. Upon receiving image frequency content for the both images 104a and 104b, it is determined in step 206 if the values of the frequency content of these images are eligible for stereo disparity. The criteria for eligibility of the frequency content values are determined empirically and are application specific. An example of the frequency content quality measure for the monocular image is provided in table 1 below.

Monocular Image Frequency Content:

TABLE 1

| | |
|---|---|
| 80%-100% | very good quality |
| 60%-79% | borderline quality |

TABLE 1-continued

| | |
|---|---|
| 40%-59% | seriously degraded |
| 20%-39% | obstructed |
| 0%-19% | obstructed |

As illustrated in table 1 above, the image quality measure for monocular image is return integer values between some lower bound and 100(%). The monocular image quality measure ranges between 0-100. So, for the image to be eligible for stereo disparity, the image frequency content values of each of the monocular images 104a and 104b must fall preferably within the range of 60% to 100% as provided in Table 1 above. The images 104a and 104b having the frequency content values falling within the range of 0% to 59% are preferably considered to be ineligible for stereo disparity.

Referring back to the flow chart in FIG. 2, if is determined that the frequency content values are not eligible, then steps 202 and 204 are repeated for both the cameras 102a and 102b. However, if it is determined that the values are eligible, the stereo disparity image is computed in step 208. The stereo disparity image is computed by from the images 104a and 104b captured by both cameras 102a and 102b using, a known stereo disparity algorithm. Any stereo image disparity algorithm is suitable as input to the stereo disparity fragmentation measurement that explicitly labels as invalid those points/pixels with insufficient contrast or texture and labels as valid those points/pixels with sufficient contrast by algorithm's own definition for stereo matching. Note that the stereo image disparity algorithm determines the validity of the image based on a per pixel basis of validity, not a global or per region basis of validity, as is done in the present invention. One example of a suitable stereo output is that produced by the Pyramid Vision Technologies Acadia-I™, which computes stereo by finding the best match using the Sum-of-Absolute-Differences (or SAD) matching measure. So, the stereo disparity image typically contains both valid and invalid disparity pixels, with each pixel's status depending on some local image quality criteria set by the given specific stereo disparity algorithm.

Alternatively, as shown in FIG. 2, the stereo disparity quality measure can be obtained without measuring of the frequency content value. Thus, the stereo disparity image can be computed at step 208 directly from the original images 104a and 104b captured at step 202 without first determining the frequency content value at step 204. To compute stereo disparity quality measure, the disparity image is first converted into a binarized disparity image 112 at step 210 using the binarized converted module 110. A value of 0 is given for all pixels with invalid regions (blank areas) and value of 1 for all pixels with valid regions (solid figures).

Then at step 212, an AAPD is computed by the disparity AAPD module 106c for the binarized disparity image 112. Then, using the same AAPD or average-adjacent-pixel-difference function described previously (having the notable advantage of requiring only a single pass through the disparity image pixels), the number of binary edge discontinuities between valid and invalid regions (both left-right and up-down) are summed, then this sum is subtracted from the total number of valid disparity image pixels, then this result is divided by the total number of valid disparity image pixels which yields the disparity quality values. As discussed above, the stereo disparity algorithm defines the valid and invalid disparity image pixels. A small number of large cohesive disparity regions will increase the disparity quality value, and a larger number of small, fragmented regions will decrease the disparity quality value. Thus, the obstructed/degraded image frames have lower disparity quality values due to their many small disparity regions and the unobstructed image frames will have higher disparity quality values due to their lesser number of large disparity regions. Note that the sharing of the basic AAPD computational functionality can have implementation advantages; for example both the monocular and stereo uses could share the same block of hardware such as a Field Programmable Gate Array (FPGA) or Application Specific Integrated Circuit (ASCI).

Referring back to FIG. 2, after computing the stereo disparity quality value at step 212, it is determined in step 214 if the values of the stereo disparity quality values are eligible for further processing. If it is determined that the values of the stereo disparity are not eligible for further processing, then the process is repeated beginning with step 202. However, if the value is considered eligible for further processing, then the process for image quality ends and the images may be forwarded for additional processing. The criteria for eligibility of the stereo disparity quality values are also determined empirically and are application specific. An example of the stereo disparity measure for the stereo image is provided in table 2 below.

Stereo Disparity Measure:

TABLE 2

| | |
|---|---|
| 85%-100% | very good quality |
| 75%-84% | acceptable quality |
| 65%-74% | borderline quality |
| <0%-64% | unacceptable |

As illustrated in table 2 above, the image quality measure for stereo disparity image also returns integer values between some lower bound and 100(%). The stereo disparity quality measure actually ranges between −299 and 100, but any values below 0 may be treated as 0 since the quality is already so poor. So, for the stereo disparity image 109 to be considered eligible for additional processing, the stereo disparity measure of the binarized stereo disparity image 112 must fall preferably within the range of 75% to 100% as provided in Table 2 above. The binarized stereo disparity image 112 having the stereo disparity values falling within the range of any number below 0% to 74% are preferably considered to be ineligible for additional processing.

For most real-world scenes without any camera impairments, the stereo disparity image fragmentation measurement is expected to be low, that is, the stereo disparity quality is expected to be high. In other words, it is expected of the world to consist of mostly cohesive regions of disparity representing solid surfaces and objects. Conversely, cameras with impairments of the kind described previously would experience many disjoint regions of both valid disparity and invalid disparity pixels, and thus high disparity image fragmentation yielding a low stereo disparity quality, as the stereo algorithm struggles with the impairments.

As discussed above, stereo disparity value is measured as the number of valid disparity pixels minus the number of valid/invalid pixel transitions in the disparity image, divided by the number of valid disparity pixels. Thus a large roughly circular blob or region of disparity would have a low disparity image fragmentation, with a large number of valid disparity pixels and relatively small number of disparity region boundary valid/invalid pixel transitions. Conversely, multiple smaller regions of amorphous disparity would have a higher disparity image fragmentation, with a high ratio of disparity region boundary valid/invalid pixel transitions relative to its number of valid disparity pixels.

Referring back to the stereo image frame 1 of the FIG. 3, there is shown the disparity image of the two original images having the stereo disparity values as 77, 88 and 86 of the left third, center third and the right third of the image frame. Note again that the division of the field-of-view is arbitrary, but dividing it into thirds is suitable for many on-road applications. As illustrated in the sequence of image frames shown in FIG. 3, the right camera image is blocked from the left side which further degrades the disparity value on the left third. So, for example, the disparity values 48, 84 and 84 in the stereo image frame 2 illustrate the image deterioration on the left side of the camera. This is clearly viewed on the stereo image frame 2 with their corresponding disparity image in which the left side is turns into a blank area with few or no solid figures.

Figure 4:
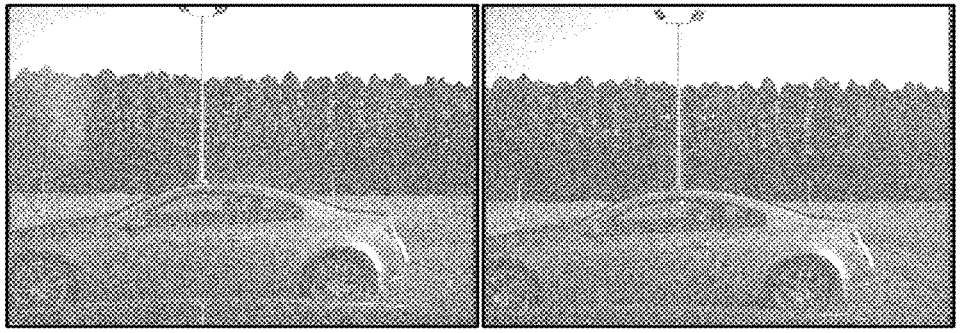
FIG. 4 illustrates two successive pairs of stereo image frames along with their corresponding quality measures in accordance with another embodiment of the present invention.
Figure 4:
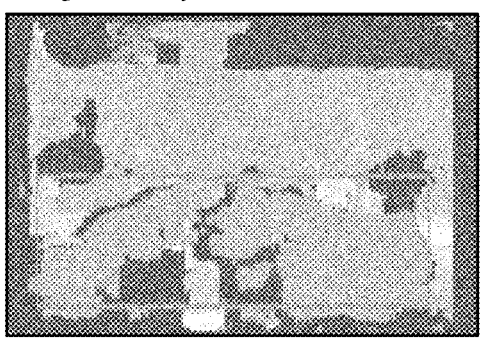
Figure 4:
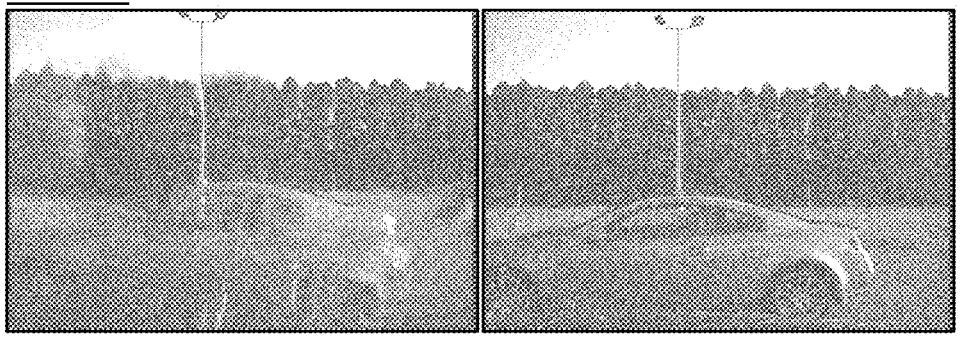
Figure 4:
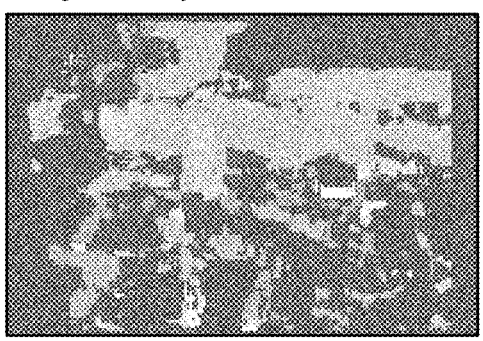

FIG. 4 illustrates another example a sequence of stereo image frames along with their corresponding quality measures. In the examples shown in FIG. 4, the image frames are again taken both from the left camera and the right camera, however, the image quality value, i.e. frequency content measure, for each frame from only the left camera is measured while the disparity quality measure value is measured by combining the images of both the left and the right cameras. Referring to stereo image frame 1 of FIG. 4, there is shown image quality values for the monocular image as 95, 99 and 95 of the left third, center third and the light third of the left image frame along with the corresponding left and right images. Also, illustrated in stereo image frame 1 of FIG. 4 is the corresponding stereo disparity image which is fairly unobstructed and mainly consists of solid figure having the disparity values as 87, 89 and 92 of the left third, center third and the right third of the image. The region on the disparity image enclosed in a rectangle corresponds to the image of a car from the left camera and the right camera. As illustrated in the sequence of image frames, specifically in image frame 2 in FIG. 4, water is splashed onto the windshield of the car, however, the majority of the liquid falls only in front of the left camera with the right camera receiving only a few drops. This degrades the frequency content value of the left third to 59 while the center and the right third remain as borderline quality as 76 and 76, as shown in stereo image frame 2 of FIG. 4. This further degrades the disparity values on the three sides of the camera images to 54, 60 and 57 and the disparity image is now obstructed with the formerly big solid figures now broken down into smaller regions with many blank areas, as viewed on the stereo image frame 2 of FIG. 4. Thus, even though the right camera produces a high quality image, due to the blurriness in the left camera, it makes it very difficult to match the image received on the left camera with the image received on the right camera, thus resulting in a very poor stereo disparity image.

Figure 5:
FIG. 5 illustrate a pair of stereo image frames along with their corresponding quality measures in accordance with an alternate embodiment of the present invention.
Figure 5:
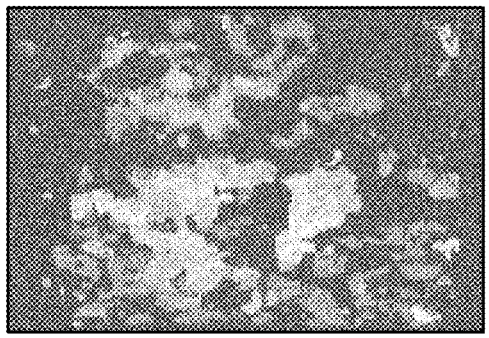
Figure 6:
FIG. 6 illustrates a pair of stereo image frames along with their corresponding quality measures in accordance with another alternate embodiment of the present invention.
Figure 6:

The two examples as described and illustrated in FIGS. 3 and 4 above include case scenarios when both disparity value scores and the frequency content value scores are both high and low at the same time. However, the present invention also includes cases in which either of the scores may be high while the other is low. For example, FIG. 5, illustrates images of the vehicle with effect of rain drops on the windshield with no wipers. In this example, the individual camera AAPD values are high, due to the sharp image focus as illustrated by the frequency content values as 98, 97 and 95 of the left third, center and right third of the left camera monocular image. However, since the rain drops visible on the windshield in front of one of the two stereo cameras is entirely different from those of the other camera, the stereo algorithm performs poorly and the disparity score is poor displayed as 62, 70, and 61 of the left third, center and right third of the stereo disparity image in FIG. 5. In another case scenario, for windshield-wiper obstruction example in FIG. 6, where the disparity quality score of the left side of the vehicle in the disparity image is high as displayed as 76, 35 and 86 but the frequency content scores of the left side of the vehicle in the disparity image are low as shown 53, 50 and 92, which would correctly result in a rejection. This case can also occur when the stereo calibration is very good and the stereo algorithm can perform correctly in the presence of conditions such as poor image focus.

Even though, the examples described above are related to the obstructive view received by one or more cameras and poor focus settings, the degradation may also occur due to camera misalignment. In that case, the stereo disparity measure will provide a poor score even though the individual camera AAPD scores will be relatively good. This is because as discussed above, the AAPD computes scores based on the images from an individual camera while the stereo measure compares the images based on the images from at least two cameras. So, the AAPD is a good monocular image quality measure, while the stereo disparity measure is focused on fragmentation of the computed disparity image.

Although, the present invention described above includes division of the field-of-view into three ROIs for both image and disparity-based quality metrics, corresponding to the left, center, and right regions, additional regions could be included. More generally, any ROI of interest, for example one potentially containing a single object, may be subjected to one or more of these quality metrics. Alternatively, a more general and dense image quality mask may be (generated by processing small regions around each pixel.

The techniques described are valuable because they provide a general measure of stereo and single image quality, which is applicable against unforeseen impairments as well as the examples described. Although various embodiments that incorporate the teachings of the present invention have been shown and described in detail herein, those skilled in the art can readily devise many other varied embodiments that still incorporate these teachings without departing from the spirit and the scope of the invention.

The invention claimed is:

1. A computer-implemented method for measuring Image quality as a determination of eligibility of images to be used for additional processing, comprising:
   receiving at least two input images of a region of interest;
   determining values of image frequency content of the at least two input images by computing an adjacent pixel difference for each valid pixel in the region of interest, summing the adjacent pixels' absolute differences of each of the at least two input images and computing the average adjacent pixel difference within the region of interest;
   computing a stereo disparity image from the at least two input images if the values are within a specific threshold using the average adjacent pixel difference.

2. The method of claim 1 wherein the at least two input images are original images received from an image sensor and every pixel in the region of interest is considered valid.

3. The method of claim 1 further comprising converting the at least two input images into a binarized disparity image by a binarized disparity module.

4. The method of claim 1 wherein said stereo disparity image is computed from a stereo algorithm, said stereo algorithm explicitly labels each output pixel in the region of interest as valid or invalid.

5. The method of claim 1 wherein each of the at least two input images in the region of interest comprise an entire image.

6. The method of claim 1 wherein each of the at least two input images in the region of interest comprise a left region of interest, a central region of interest and a right region of interest.

7. The method of claim 1 wherein the stereo disparity image is computed if the average adjacent pixel difference of the original image is within a specific threshold.

8. The method of claim 1 comprising converting the stereo disparity image into a binarized disparity image.

9. The method of claim 3 comprising forwarding the disparity image for additional processing if the average adjacent pixel difference of the binarized disparity image is within a specific threshold.

10. A computer-implemented system for measuring image quality as a determination of eligibility of images to be used for additional processing, comprising:
   an average adjacent pixel difference module to determine values of image frequency content of at least two input images by computing an adjacent pixel difference for each valid pixel in the region of interest, summing the adjacent pixels' absolute differences of each of the at least two input images and computing the average adjacent pixel difference within the region of interest;
   a stereo disparity module to compute a stereo disparity image from the at least two input images using a stereo algorithm comprising using the average adjacent pixel difference if the values are within a specific threshold.

11. The system of claim 10 further comprising at least one sensor to capture the at least two input images in a region of interest.

12. The system of claim 11 wherein the at least two input images are original images received from the sensor and every pixel in the region of interest is considered valid.

13. The system of claim 12 wherein said stereo algorithm explicitly labels each output pixel in the region as valid or invalid.

14. The system of claim 10 further comprising a binarized disparity module to convert the stereo disparity image into a binarized disparity image.

15. The system of claim 10 wherein each of the at least one two input images in the region of interest comprise an entire image.

16. The system of claim 10 wherein each of the at least two input images in the region of interest comprise a left region of interest, a central region of interest and a right region of interest.

17. The system of claim 10 wherein the stereo disparity image is computed if the average adjacent pixel difference of the original image is within a specific threshold.

18. The system of claim 14 wherein the stereo disparity image is forwarded for additional processing if the average adjacent pixel difference of the binarized disparity image is within a specific threshold.

19. the method of claim 1 further comprising:
   processing the stereo disparity image to determine eligibility of the stereo disparity image for additional processing comprising at least object detection; and
   forwarding the stereo disparity image for the additional processing if the stereo disparity image is determined to be eligible.

20. the system of claim 10, further comprising:
   an object detection module to process the stereo disparity image to determine eligibility of the stereo disparity image for additional processing, comprising at least object detection, and to forward the stereo disparity image for the additional processing if the stereo disparity image is determined to be eligible.

* * * * *